(No Model.)
P. J. KAISER.
COMPASS.
No. 487,330. Patented Dec. 6, 1892.
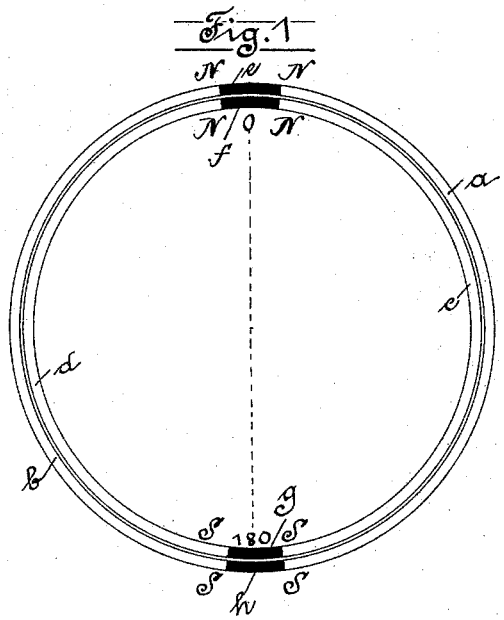
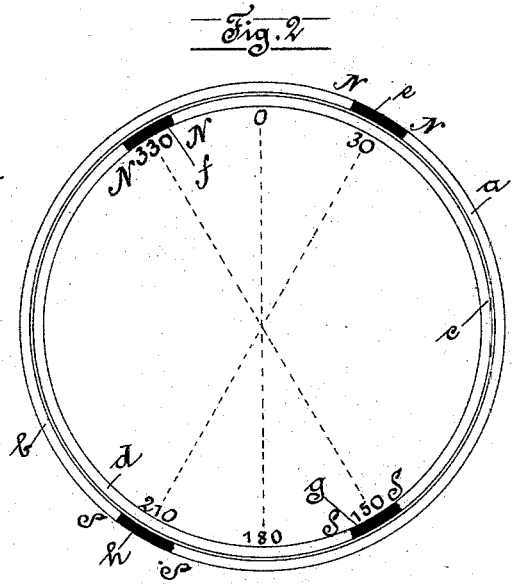
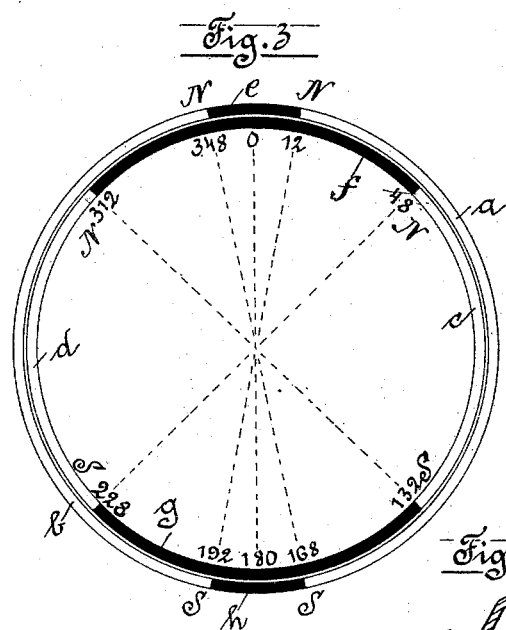
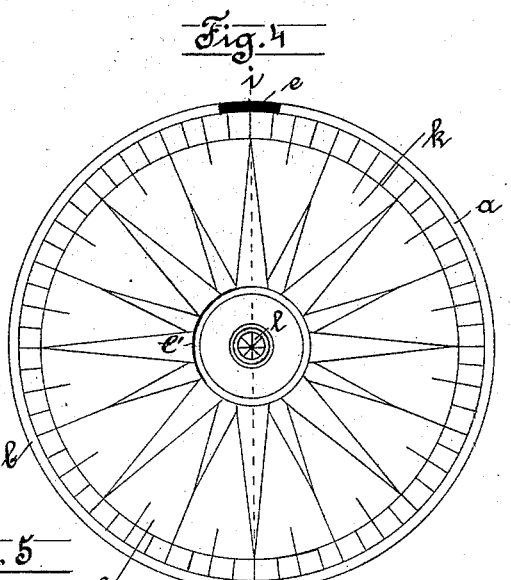
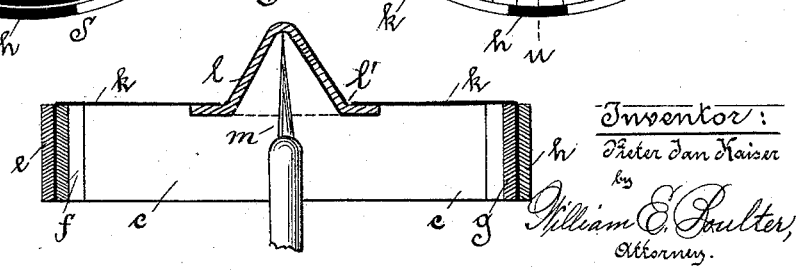
Witnesses:
G. A. Taube.
Wilhelm Huth.
Inventor:
Peter Jan Kaiser
by William E. Poulter,
Attorney.

UNITED STATES PATENT OFFICE.

PIETER JAN KAISER, OF LEYDEN NOORDEINDE, NETHERLANDS.

COMPASS.

SPECIFICATION forming part of Letters Patent No. 487,330, dated December 6, 1892.

Application filed February 11, 1891. Serial No. 381,074. (No model.)

*To all whom it may concern:*

Be it known that I, PIETER JAN KAISER, a subject of the King of Holland, and a resident of Leyden Noordeinde, in the Kingdom of Holland, have invented certain new and useful Improvements in Compasses, of which the following is a full, clear, and exact specification.

The invention relates to compasses, and among the objects in view are to provide a compass which shall in an extraordinary degree be capable of remaining undisturbed by disturbing magnetic influences, and which shall be of small weight combined with great magnetic force; and the invention consists in the peculiar construction, arrangement, and combination of parts, as hereinafter fully described, illustrated in the accompanying drawings, and pointed out in the appended claims.

In the drawings, Figure 1 is a plan view of my improved compass-magnets in detail; Fig. 2, a like view showing a slightly-different arrangement of the magnetic poles; Fig. 3, a like view showing still another arrangement of such poles; Fig. 4, a plan view of the compass-magnets shown in Fig. 1, provided with a card; Fig. 5, a vertical section on line $i\ u$ of Fig. 4.

In my compass the ordinary straight magnetic needle or parallel needles used hitherto are replaced by two annular magnets, each of which is composed of two single magnets of semicircular shape, so arranged that the poles of like name are all on the same side of the magnet-ring and the poles of same names, as well as the two rings being isolated from each other by any non-magnetic material. The reasons which led to this construction and the principles on which said construction is based are as follows: It has long been desired to obtain a compass the magnets of which combined little weight with great magnetic force, for the reason that experiments have proved that a magnet of little weight or small mass is less subjected to perturbations than a magnet of greater weight. It has also been found that a magnet containing more magnetism than another of like weight was more reliable in use; but as the capacity of a needle for magnetism depends upon the quantity of steel contained therein it follows that it is impossible to combine both the desired advantages above enumerated in one and the same needle, an advantage in one direction resulting in a disadvantage in the other. Therefore the weight of the needle should be a minimum and its magnetic capacity a maximum in order to obtain the best results, and to accomplish this object in as great a degree as possible I construct the magnet substantially as shown and presently described.

For the sake of clearness the magnets are shown in all the views as being much thicker and broader than the same would be constructed in practice.

In carrying out my invention I take two magnets $a\ b$ of semicircular shape and connect them at their ends by pieces $e\ h$ of any non-magnetic material having a specific gravity approximating that of steel. Thus a ring is formed having like poles adjacent to each other—*i. e.*, on the same side. The pieces $e\ h$ serve to connect the magnets and separate the poles of the same name, as will be seen from the drawings. Within the ring formed, as described, I form another ring composed of the semicircular magnets $c\ d$, arranged similarly to the magnets $a\ b$—that is to say, with the poles of like name adjacent to each other and also adjacent to the poles of like name of said outer magnet, as shown, the non-magnetic pieces $f\ g$ serving to connect the inner magnets. It will be observed that the inner ring is so disposed that it will be isolated from the outer ring, its diameter being slightly less than that of said outer ring. A card formed by a piece of silk $k$ or other suitable material is placed over the inner ring, the center of the rose coinciding exactly with the center of the magnetic ring. The larger ring is placed over the smaller one so as to press down the silk, thus confining its edge between the two rings, as seen plainly in Fig. 5. The piece of silk $k$ is provided with a central opening $l'$, within which is secured a conical shell $l$, (which may be provided with a sapphire cap at its inner angle,) whereby the whole device is supported and adapted to freely turn upon a pin $m$, suitably secured to the bottom of the compass-casing.

The arrangement shown in Fig. 1 I have found to be of value when the disturbing magnetic influences are somewhat remote from the instrument. When said influences are in proximity thereto, the arrangement shown in Fig. 2 will be found to be of greater value. In this arrangement both the rings are constructed in exactly the same manner, but the position of the rings with regard to each other is such that the magnetic poles of like name are at an angle of about sixty degrees to each other.

In Fig. 3 I have shown an arrangement which is of greatest value when the disturbing magnetic influences are very great. In this arrangement the inner magnets $c\ d$ are of considerably-less length than the outer magnets. The poles of like name of the inner ring are at a distance of about ninety-six degrees from each other, while those of the outer ring are at a distance of about twenty-four degrees.

The manner of connecting both the rings is the same in all the arrangements described, and I wish it to be understood that more than two rings may be employed if this is found desirable for any special purpose, and the position of the rings with regard to each other may be varied according to any requirement. The number of the magnets may also be varied and other modifications made in the construction of the device without departing from the spirit of my invention.

I am aware that there exists a compass somewhat similar in appearance to mine. It, however, differs in being composed of one uninterrupted ring of steel magnetized so as to act like a simple straight magnetic needle. In this arrangement a displacement of the magnetic poles from the magnetic meridian may easily occur, an objection which I avoid in my instrument. Moreover, said first-mentioned compass requires considerable non-magnetic material in its construction and will be found not to answer the requirements that my compass will.

Having thus fully described the nature of this invention, what I desire to secure by Letters Patent of the United States is—

1. In a compass, the combination of a series of curved magnets with non-magnetic material connecting the magnets so as to form rings and separating poles of the same names, substantially as and for the purpose described.

2. A magnet-ring system composed of curved magnets $a\ b\ c\ d$ and non-magnetic material $e\ h\ f\ g$, inserted between poles of the same name, one ring being placed within the other, substantially as and for the purpose described.

3. The combination of the magnet-systems composed of two magnets $a\ b\ c\ d$ with a card $k$, made of silk or the like, said card covering the space inclosed by the rings, the whole device being adapted to rotate on a pivot, substantially as and for the purpose as described.

In testimony whereof I have signed this specification in the presence of two subscribing witnesses.

PIETER JAN KAISER.

Witnesses:
LEONARD KOOT,
M. D. GARDNER.